United States Patent

Mori et al.

[11] Patent Number: 5,805,255
[45] Date of Patent: Sep. 8, 1998

[54] LIQUID-FILLED OPTICAL DEVICE

[75] Inventors: Hiroyuki Mori; Takashi Terai, both of Tokyo, Japan

[73] Assignee: Pioneer Electronic Corporation, Tokyo, Japan

[21] Appl. No.: 597,192

[22] Filed: Feb. 6, 1996

[30] Foreign Application Priority Data

Feb. 6, 1995 [JP] Japan .................................. 7-041358

[51] Int. Cl.⁶ ............................................ G02F 1/1335
[52] U.S. Cl. ........................ 349/161; 349/5; 165/104.31
[58] Field of Search ................ 349/5, 57, 6, 7, 349/8, 114, 58, 72, 161, 96; 353/52, 54; 359/495, 496, 498; 165/104.28, 104.31, 109.1, 120, 122; 362/294

[56] References Cited

U.S. PATENT DOCUMENTS

| | | | |
|---|---|---|---|
| 3,638,140 | 1/1972 | Knapp et al. ...................... | 165/104.31 |
| 3,723,739 | 3/1973 | Horton ..................................... | 349/161 |
| 4,772,098 | 9/1988 | Ogawa ..................................... | 349/5 |
| 4,890,208 | 12/1989 | Izenour .................................... | 362/294 |
| 5,032,021 | 7/1991 | Kanatani et al. ......................... | 353/54 |
| 5,170,195 | 12/1992 | Akiyama et al. ......................... | 353/54 |
| 5,282,121 | 1/1994 | Bornhorst et al. ....................... | 353/54 |
| 5,432,526 | 7/1995 | Hyatt ....................................... | 349/161 |
| 5,502,582 | 3/1996 | Larson et al. ............................ | 349/62 |
| 5,647,662 | 7/1997 | Ziegler et al. ........................... | 362/294 |

FOREIGN PATENT DOCUMENTS 3-155533  7/1991  Japan ..................................... 349/161

*Primary Examiner*—William L. Sikes
*Assistant Examiner*—Tai V. Duong
*Attorney, Agent, or Firm*—Sughrue, Mion, Zinn, Macpeak & Seas, PLLC

[57] ABSTRACT

A liquid-filled optical device has an optical casing filled with liquid. An agitation device is provided for agitating the liquid in the optical casing so as to effect convection of the liquid. The agitation device comprises a propeller disposed in the liquid in the optical casing, and a rotating device for rotating the propeller.

4 Claims, 4 Drawing Sheets

FIG. 1 a
FIG. 1 b
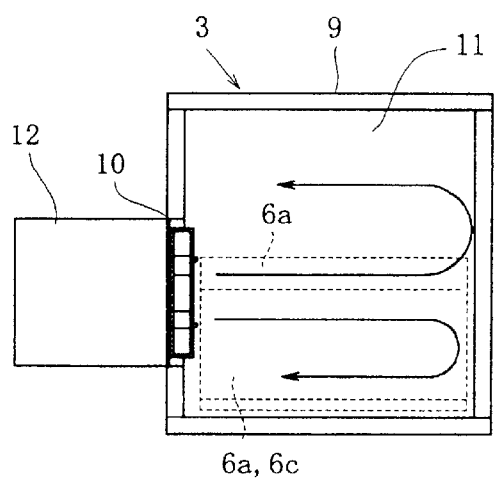
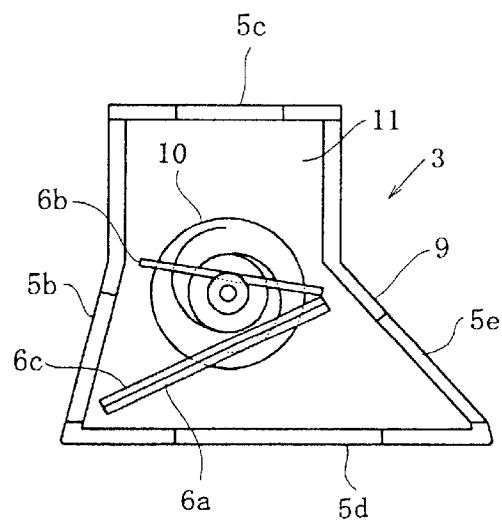
FIG. 1 c
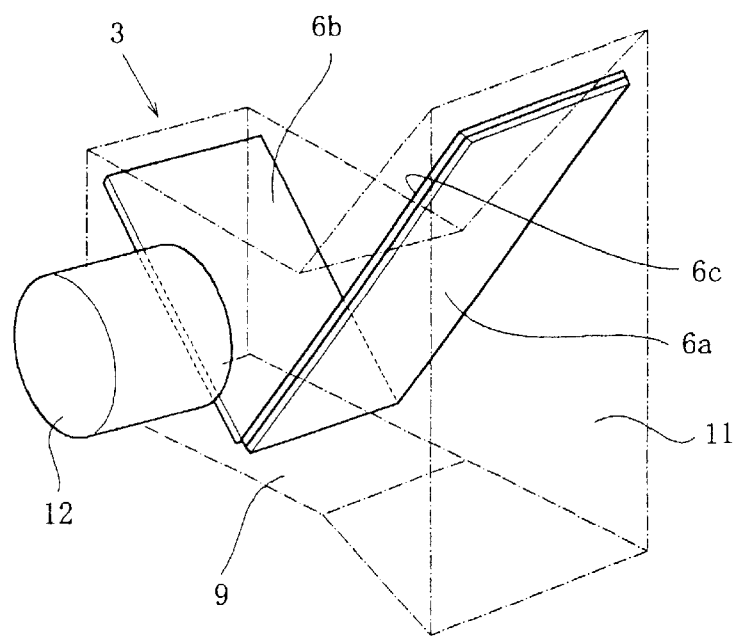

FIG. 4 a
FIG. 4 b
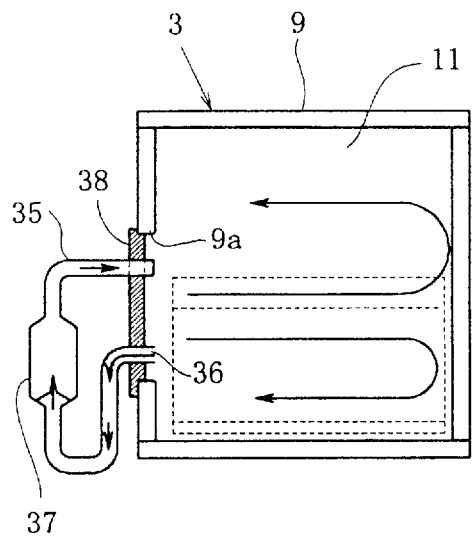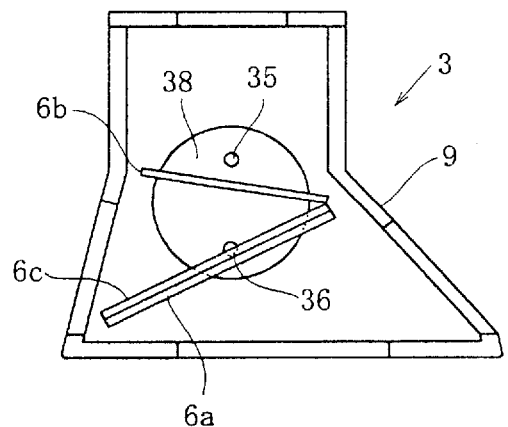
FIG. 5 a
FIG. 5 b
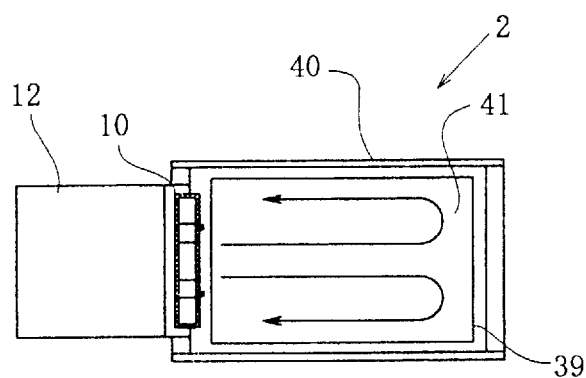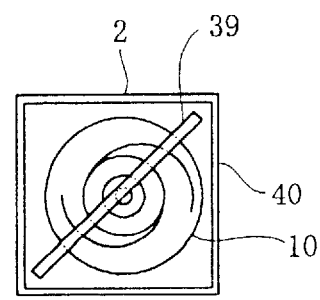

LIQUID-FILLED OPTICAL DEVICE

BACKGROUND OF THE INVENTION

The present invention relates to a liquid-filled optical device such as a polarized beam splitter and a dichroic mirror employed in a liquid crystal projection device, and more particularly to an improvement of the beam splitter and the dichroic mirror.

In the liquid crystal projection device, a CRY display or a liquid crystal display is used.

FIG. 6 shows a conventional liquid crystal projection device employed with a dichroic mirror for separating and synthesizing the three primary colors of the light.

The device comprises a light source 1a for the white light such as a halide lamp or xenon lamp, a reflector 1b for reflecting beams emitted from the light source 1a in parallel, a polarized beam splitter 2 of a liquid filled type and having a cubic shape applied with the white light from the reflector 1b, and an optical device 3 of a liquid-filled type applied with the P polarized light passed through the beam splitter 2. Three liquid crystal reflection panels 4a, 4b and 4c are provided on the optical device 3 adjacent to the emerging surfaces thereof. A projection lens 7 and a screen 8 are further provided.

The liquid-filled optical device 3 comprises a hollow optical casing 9 made of plastic and filled with a liquid 11. A pair of dichroic mirrors 6a and 6b are provided in the casing 9 so as to be immersed in the liquid 11. The dichroic mirror 6a reflects the component R and transmits the other components G and B. The dichroic mirror 6b reflects the component G and transmits the component B. A reflector 6c is formed on the dichroic mirror 6a at a side facing to the dichroic mirror 6b. An air gap is formed between the dichroic mirror 6a and the reflector 6c.

The optical casing 9 has a transmissible reflector 5d provided on a surface opposite to an optical path of the polarized beam splitter 2, and three transmissible emerging plates 5a, 5b and 5c provided on the emerging surfaces corresponding to the liquid crystal panels 4a, 4b and 4c, respectively.

The liquid-filled polarized beam splitter 2 comprises a hollow optical casing 40 made of plastic and filled with a liquid 41. A reflector 39 is provided in the casing 40 disposed in the liquid 41. Three transmitting plates 2a, 2b and 2c are provided on the casing 40 corresponding to the respective optical paths.

In operation, the white light emitted from the white light source 1a is reflected on the reflector 1b so as to arrange the light in parallel which is applied to the beam splitter 2. The reflector 39 of the beam splitter passes through the P polarized light of the white light and reflects the S polarized light. The P polarized ray strikes the reflector 5d of the optical device 3.

The white light goes through the liquid 11 and strikes the dichroic mirror 6a which reflects the component R and transmits the components G and B.

The reflected component R strikes the reflector 5d to be reflected therefrom. The reflected light emerges from the emerging plate 5a and is applied to the reflection type liquid crystal panel 4a.

The components G and B passed through the dichroic mirror 6a and the reflector 6c strike the dichroic mirror 6b which reflects the component G and transmits the component B.

The reflected component G is further reflected from the reflector 6c. The reflected component G emerges from the emerging plate 5b and is applied to the reflection type liquid crystal panel 4b.

The component B passed through the dichroic mirror 6b goes through the liquid and emerges from the emerging plate 5c and is applied to the reflection type liquid crystal panel 4c. Each panel modulates the incident ray in luminous intensity in accordance with a predetermined signal (for a example television color video signal) which corresponds to one of three primary colors R, G and B. Each of the modulated components is transmitted through the panel and is reflected from a reflector (not shown) in the panel and passes through the panel, so that the P polarized light is converted into S polarized light.

The components again enter the optical device 3 at the emerging plates 5a, 5b and 5c, respectively. In the device, the components are optically synthesized in reverse manners and applied to the beam splitter 2. The reflector 39 reflects the synthesized S polarized ray to the projection lens 7. The projection lens 7 expands the light to be projected on the screen 8, thereby displaying an image.

However, the optical casings 9, 40, reflector 39, dichroic mirrors 6a, 6b are subjected to optical or thermal stress. Accordingly, the contrast of the beam splitter 2 and optical device 3 may be lowered and the uniformity of color of the image may be deteriorated.

In order to avoid these disadvantages, each of the optical casings 9 and 40 is filled with a liquid, for example, a mixture of glycerol and ethylene glycol, which is matched with the refractive indices of the reflector 5d, emerging plates 5a, 5b 5c, and transmitting plates 2a, 2b, 2c.

In the liquid crystal projection device, if a screen having a wide visual field angle is used, or if it is desirable to obtain a clear image even if a room is bright, it is necessary to employ a light source having a large amount of power. In this case, the optical devices are heated by heat from the light source.

FIG. 7 shows characteristics of the refractive index of the liquid in the optical casing with respect to the temperature.

When the temperature of the liquid rises, the refractive index thereof is gradually decreased. In the liquid of the optical casing, the temperature of the liquid in a central portion of the casing increases at a different speed from that of the liquid at a peripheral portion near glass walls of the casing. Namely, the liquid at the central portion is rapidly heated, while the liquid at the periphery is slowly heated. Accordingly, there is formed uneven temperature distribution in the liquid, thereby causing inequality in refractive index.

In the conventional device, a problem still arises because of the inequality of refractive index. Since image forming efficiency deteriorated owing to the inequality of refractive index, the image is blurred in the projection device having a large screen or in the device for a high luminance display, having a large power light source.

SUMMARY OF THE INVENTION

An object of the present invention is to provide a liquid-filled optical device in which the temperature of the liquid is uniformly distributed, thereby providing equality in refractive index of the liquid.

According to the present invention, there is provided a liquid-filled optical device for an optical device having an optical casing filled with liquid, comprising an agitation device provided for agitating the liquid in the optical casing so as to effect convection of the liquid.

In a feature of the present invention, the agitation device comprises a propeller disposed in the liquid in the optical casing, and a rotating device for rotating the propeller.

In another feature of the present invention, the agitation device may have a fin disposed in the liquid in the optical casing, and an oscillation device for oscillating the fin.

In yet another feature of the present invention, the agitation device may comprise an outlet pipe and an inlet pipe in communication with a space in the optical casing, and a pump for discharging the liquid in the optical casing from the outlet pipe and supplying the discharged liquid to the optical casing.

The other objects and features of this invention will become understood from the following description with reference to the accompanying drawings.

BRIEF DESCRIPTION OF DRAWINGS

FIG. 1a is a front view showing a liquid-filled optical device according to the present invention;

FIG. 1b is a side view of the optical device;

FIG. 1c is a schematic perspective view of the optical device;

FIG. 4a is a front view showing a third embodiment of the present invention;

FIG. 4b is a side view of FIG. 4a;

FIG. 5a is a front view showing a fourth embodiment of the present invention;

FIG. 5b is a side view of FIG. 5a;

DETAILED DESCRIPTION OF THE PREFERRED EMBODIMENTS

Figure 6:
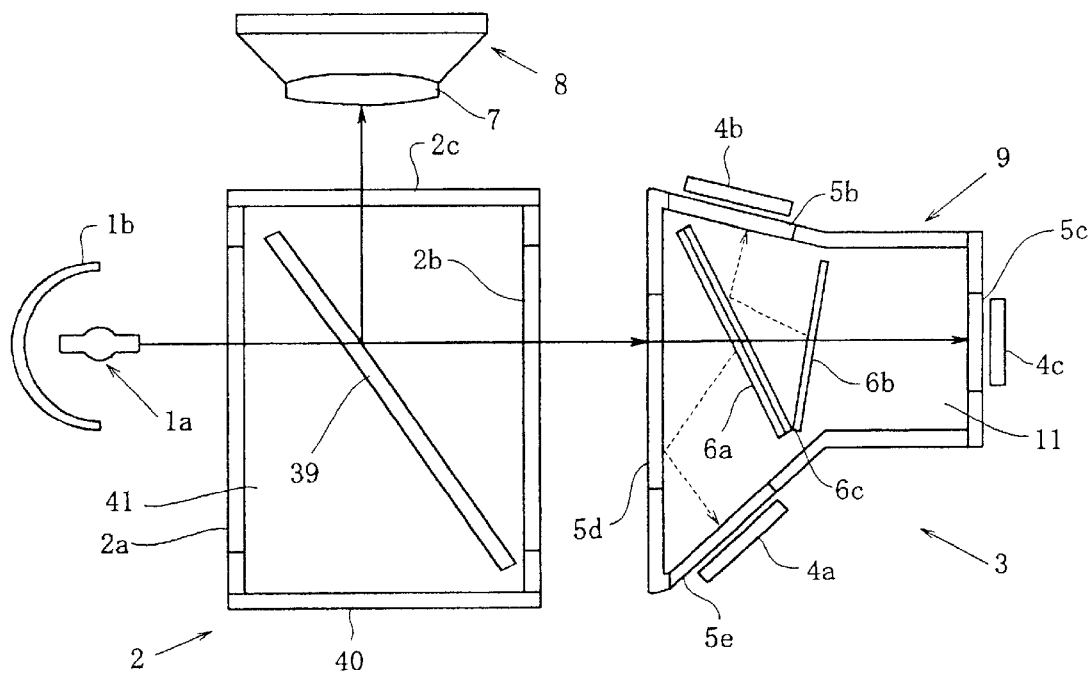
FIG. 6 is a schematic diagram showing a conventional liquid crystal projection device.
Figure 7:
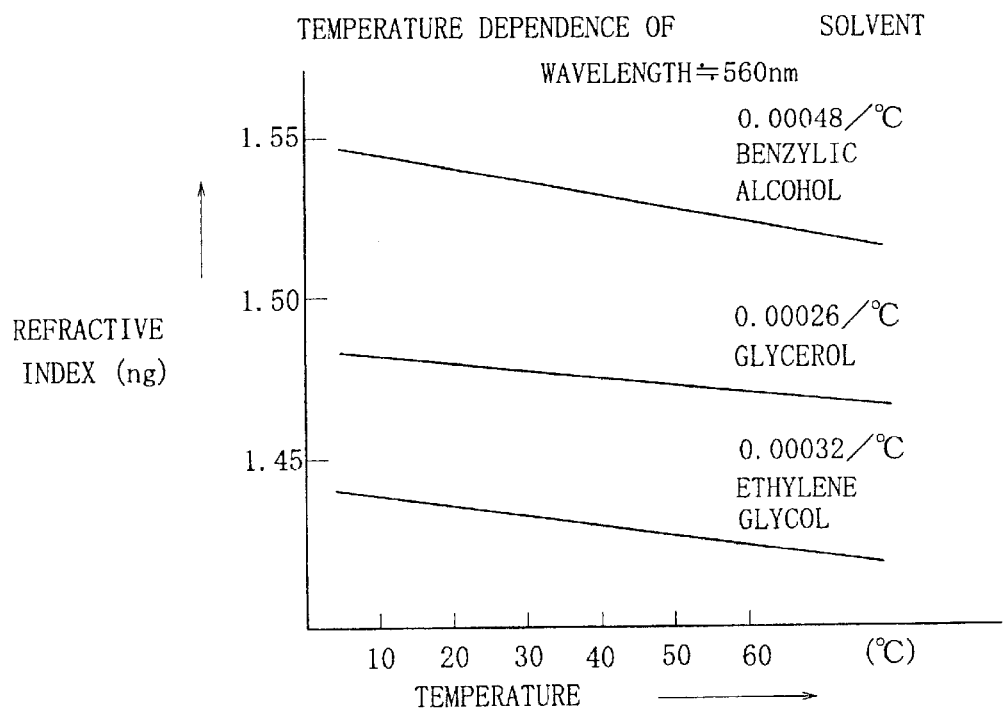
FIG. 7 is a diagram showing a characteristic of a refractive index of a liquid in the optical device with respect to temperature.

Referring to FIGS. 1a, 1b and 1c showing a liquid-filled optical device of the present invention employed in a liquid crystal projection device for the three primary colors, parts which are the same as the conventional device are identified with the same reference numerals as FIG. 6. For simplification, the liquid crystal panels 4a, 4b and 4c are omitted and as shown in FIG. 1c, the reflector 5d and the emerging plates 5a, 5b 5c are omitted from the optical casing 9.

In order to render the temperature of the liquid 11 in the optical casing 9 uniform, the liquid-filled optical device 3 of the present invention has a stirring device 10 for stirring the liquid for agitation and convection of the liquid. The stirring device 10 is provided on the casing 9 and driven by a drive device 12 of a non-contact type.

The dichroic mirrors 6a and 6b are mounted in the casing 9 at positions effective in achieving convection of the liquid 11 and secured thereto by a connecting member (not shown). The liquid 11 is a mixture of glycerol and ethlene glycol.

Figure 2:
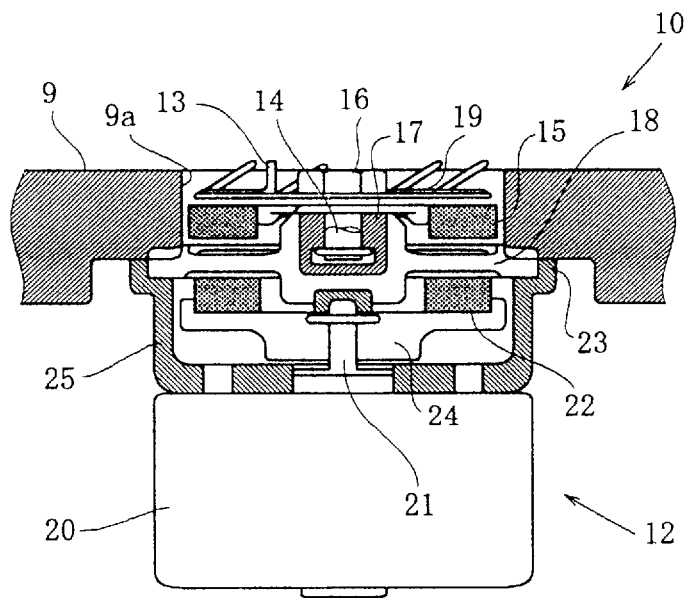
FIG. 2 is a sectional view showing a stirring device of the present invention.

FIG. 2 shows the stirring device 10 and the drive device 12. The stirring device 10 comprises an annular propeller portion 19 having a propeller 13 made of aluminum, iron or plastic. An annular magnet 15 is secured to a flat portion on a back of the propeller portion 19. The propeller portion 19 is mounted on a shaft 14 and secured thereto with a nut 16. The shaft 14 is rotatably mounted in a bearing 17 which is secured to a propeller holder 18.

The stirring device 10 is inserted in an opening 9a formed in one of the sides of the casing 9 and the propeller holder 18 is secured to an outside periphery of the opening 9a through a sealing member 23 such as silicone rubber in the form of a ring. Thus, the stirring device 10 is hermetically engaged with the casing 9.

The drive device 12 comprises a motor 20 having a rotating shaft 21, and a motor holder 25 having a cylindrical shape and secured to the motor 20 such that the rotating shaft 21 projects into the motor holder 25. A magnet holder 24 to which an annular magnet 22 is adhered is secured to the rotating shaft 21 at a position corresponding to the magnet 15 of the stirring device 10. The motor 25 is secured to the casing 9 through the motor holder 25 and the propeller holder 18.

Each of the magnets 15 and 22 comprises a plurality of magnetic blocks arranged into a ring in a manner the N pole and S pole alternately arranged.

The magnets 15 and 22 are magnetically connected to each other through the propeller holder 18.

In operation, when the motor 20 is driven, the magnet holder 24 secured to the rotating shaft 21 is rotated. Since the magnet 22 on the magnet holder 24 is magnetically connected to the magnet 15 of the propeller portion 19, the propeller 13 on the propeller portion 19 is rotated. Thus, the liquid 11 in the casing 9 is stirred by the propeller 13 to perform the agitation and convection of the liquid.

The driving device of the non-contact type has advantages that it is not necessary to provide a sealing means for the device, it can be easily assembled, namely the drive device can be attached to the casing 9 after the driven part is attached to the casing, and that the maintenance thereof is easy.

Figure 3A:
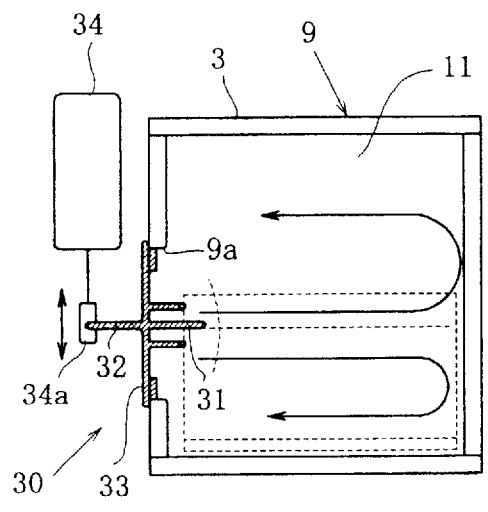
FIG. 3a is a front view showing a second embodiment of the present invention.
Figure 3B:
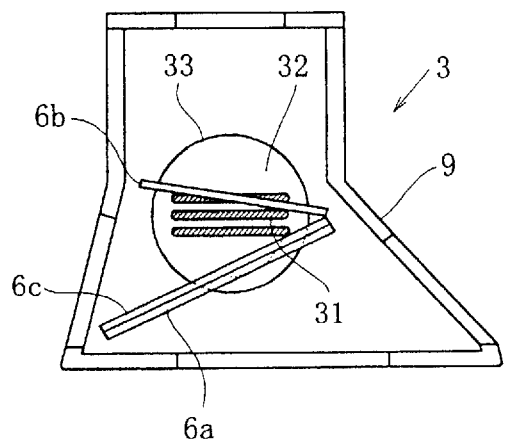
FIG. 3b is a side view of the second embodiment.

Referring to FIGS. 3a and 3b showing a second embodiment, the optical device 3 has a stirring device 30 of a type of a fin mechanism. The stirring device 30 comprises a holder 33 secured to the periphery of the opening 9a of the casing 9, a plurality of fins 31, each having sector shapes and projected in the casing and immersed in the liquid 11, and an operating rod 32 outwardly projected from the holder 33. The stirring device 30 is integrally formed by an elastic material such as rubber.

A reciprocating drive device 34 having a rod 34a connected to the operating rod 32 is provided for driving the stirring device 30.

In operation, the rod 34a is reciprocated to move the operating rod 32. Thus, the fins 31 in the liquid are reciprocated in the opposite direction as a fulcrum at a position where the operating rod 32 is connected to the holder 33. Consequently, the agitation and convection of the liquid are performed.

FIGS. 4a and 4b show a third embodiment. A stirring device comprises a pump 37 having an inlet pipe 35 and an outlet pipe 36 provided opposite to the inlet pipe. A holder 38 made of an elastic material such as rubber is secured to the opening 9a of the casing 9. The inlet and outlet pipes 35 and 36 are held by the holder 38 to be communicated with the space in the casing 9.

When the pump 37 is operated, the liquid in the casing 9 is discharged from the outlet of the outlet pipe 36 and fed to the casing 9 from inlet of the inlet pipe 35 through the pump 37. Thus, the liquid is forcibly stirred to accomplish agitation and convection.

The stirring devices of the present invention can be employed for the liquid-filled spectral beam splitter 2 of FIG. 6.

FIGS. 5a and 5b show a fourth embodiment where the stirring device 10 driven by the drive device 12 is provided on the casing 40 of the beam splitter 2. The reflector 39 is secured to the casing 40 at positions so as to form gaps between both edges of the reflector and the walls of the casing, thereby effecting the convection of the liquid. The liquid 41 is the mixture of glycerol and ethylene glycol which is the same component as the liquid 11.

Since the operation is the same as the previous embodiment of FIG. 1, the detailed description thereof is omitted.

The stirring devices shown in FIGS. 3 and 4 may also be employed for the beam splitter to obtain the same effect as those of the previous embodiments.

As the liquid, one of etylene glycol, glycerol, silicone oil, and benzylic alcohol or a mixture of at least two liquids can be employed.

In accordance with the present invention, an optical device has a stirring device for forcibly stirring a liquid in the optical device, thereby accomplishing agitation and convection of the liquid. Thus, the temperature of the liquid is equalized thereby to provide a uniform distribution of the refractive index of the liquid. Consequently, in a liquid crystal projection device, a decrease of efficiency for forming the image, caused by an increase of the temperature of the liquid, can be prevented.

While the presently preferred embodiments of the present invention have been shown and described herein, it is to be understood that these disclosures are for the purpose of illustration and that various changes and modifications may be made without departing from the scope of the invention as set forth in the appended claims.

What is claimed is:

1. An optical device having a light source and a liquid-filled optical device, the liquid-filled optical device having an optical casing filled with liquid, and an optical element provided in the casing, said optical device comprising:

the optical element being one of a beam splitter and dichroic mirrors;

light from the light source transmitting through the liquid so that a component of the light passes through the optical element, and an agitation device provided for agitating the liquid in the optical casing so as to effect convection and agitation of the liquid; wherein the agitation device comprises a propeller disposed in the liquid in the optical casing, and a rotating device for rotating the propeller.

2. The optical device as claimed in claim 1, wherein the rotating device is a motor disposed outside of the optical casing.

3. The optical device as claimed in claim 2, wherein the motor is coupled to the propeller for rotating the propeller by a magnetic coupling.

4. The optical device as claimed in claim 3, wherein the magnetic coupling comprises an annular magnet secured to the propeller and an annular magnet secured to the motor.

* * * * *